(12) United States Patent
Chang et al.

(10) Patent No.: US 8,549,406 B2
(45) Date of Patent: Oct. 1, 2013

(54) MANAGEMENT SYSTEM AND METHOD FOR WIRELESS COMMUNICATION NETWORK AND ASSOCIATED GRAPHIC USER INTERFACE

(75) Inventors: Wei Ling Chang, Taipei (TW); Jung Lai Tsai, Jhonghe (TW); Yu Chun Wan, Sindian (TW); Ta Gang Chiou, Cambridge, MA (US); Shu Yuan Lin, Shu-Lin (TW)

(73) Assignee: Groundhog Technologies Inc. (TW)

( * ) Notice: Subject to any disclaimer, the term of this patent is extended or adjusted under 35 U.S.C. 154(b) by 8398 days.

(21) Appl. No.: 11/812,248

(22) Filed: Jun. 15, 2007

(65) Prior Publication Data

US 2008/0109731 A1  May 8, 2008

Related U.S. Application Data

(60) Provisional application No. 60/813,932, filed on Jun. 16, 2006.

(51) Int. Cl.
*G06F 15/177* (2006.01)
(52) U.S. Cl.
USPC .......................................... 715/736; 715/738
(58) Field of Classification Search
USPC .................................................. 715/736, 738
See application file for complete search history.

(56) References Cited

U.S. PATENT DOCUMENTS

| | | | |
|---|---|---|---|
| 5,483,631 A * | 1/1996 | Nagai et al. .................... | 715/736 |
| 5,987,442 A | 11/1999 | Lewis et al. | |
| 6,442,615 B1 * | 8/2002 | Nordenstam et al. ......... | 709/241 |
| 6,456,306 B1 * | 9/2002 | Chin et al. ..................... | 715/810 |
| 6,590,587 B1 * | 7/2003 | Wichelman et al. .......... | 715/736 |
| 2003/0217133 A1* | 11/2003 | Ostrup et al. .................. | 709/223 |
| 2004/0136379 A1* | 7/2004 | Liao et al. ................ | 370/395.21 |
| 2005/0097161 A1 | 5/2005 | Chiou et al. | |
| 2007/0118421 A1* | 5/2007 | Oku ................................ | 705/10 |
| 2007/0192065 A1* | 8/2007 | Riggs et al. .................... | 702/189 |

FOREIGN PATENT DOCUMENTS

| EP | 1868320 | 6/2007 |
|---|---|---|
| WO | WO 2006/015441 | 2/2006 |

* cited by examiner

*Primary Examiner* — Steven Sax
*Assistant Examiner* — Christopher J Fibbi

(57) ABSTRACT

A management system and method for a wireless communication network and an associated interface is provided. The management system provides a structure of data layers and a visualization design to upgrade the efficiency of network management. The management system includes a data generation module and a display module. The data module generates a plurality of data layers, which comprise at least a map layer, a network configuration layer, and an operation index layer. The network configuration layer comprises a configuration of the wireless communication network on the map layer. The operation index layer includes statistic values of an operation index of the wireless communication network under the configuration. The display module performs an overlap display of a plurality of selected layers from the data layers to show operation status of the wireless communication network.

18 Claims, 9 Drawing Sheets

| MSC ▶ | Erlang ▶ | | | | | |
|---|---|---|---|---|---|---|
| Component | Operation Index | 2007/06 | 2007/07 | 2007/08 | 2007/09 | 2007/10 |
| MSC1 | Erlang | 21170 | 21142 | 20139 | 21295 | 21476 | ← Original Plan
| | | 2007/06 ※ 21170 | 2007/07 21142 | 2007/08 ※ 21476 | 2007/09 20627 | 2007/10 19788 | ← Plan-1
| | | 2007/06 ※ 21170 | 2007/07 21142 | 2007/08 20139 | 2007/09 ※ 20988 | 2007/10 18976 | ← Plan-2
| | | 2007/06 ※ 21170 | 2007/07 21142 | 2007/08 ※ 21476 | 2007/09 ※ 18976 | 2007/10 17894 | ← Plan-3

FIG. 3B

| Operation Index | Network Parameter | Adjustment |
|---|---|---|
| MSC2 ▶ | 2007/07 ▶ | |

| Item | Capacity | Original | Plan-1 |
|---|---|---|---|
| Erlang | 24000 | 16437 | 16437 |
| Erlang(%) | 80 | 68.49 | 68.49 |
| Erlang (Formula) | | [MSC BHCA]... | [MSC BHCA]... |
| Port | 3632 | 2352 | 2352 |
| Port(%) | 80 | 64.76 | 64.76 |
| Port (Formula) | | [MSC GSM Port]...... | [MSC GSM Port]...... |

FIG. 5A

| Operation Index | | Network Parameter | | Adjustment | | |
|---|---|---|---|---|---|---|
| Plan-1 ▶ | | 2007/07 ▶ | | | | |
| Time | Level | Component | Type | From | To | |
| 2007/07 | BSC | BSC3 | Rehome | MSC1 | MSC3 | |
| 2007/07 | MSC | MSC3 | Limit value (Erlang) | 24000 | 54000 | |

FIG. 5C

MANAGEMENT SYSTEM AND METHOD FOR WIRELESS COMMUNICATION NETWORK AND ASSOCIATED GRAPHIC USER INTERFACE

CROSS-REFERENCE TO RELATED APPLICATIONS

The present application claims the benefit of U.S. Provisional Application No. 60/813,932, filed on Jun. 16, 2006, which is herein incorporated by reference.

BACKGROUND OF INVENTION

1. Field of the Invention

The present invention relates to a wireless communication network, and more particularly, to a management system and method for the wireless communication network and an associated graphic user interface.

2. Description of the Prior Art

In a wireless communication network such as a mobile network, it is useful for a telecom user or network administrator to know in advance the future operation status of a network component. If a problem such as the overloading of the network component is anticipated, then the telecom user can have enough time to prepare a solution for the problem. However, the prior art does not provide an efficient and convenient tool for the telecom user to make prediction and perform network diagnosis.

Besides, the prior art predicts the future operation status of the network component by the time series prediction technique, which often lacks accuracy since only history data of the network component itself is considered.

SUMMARY OF INVENTION

It is therefore one objective of the present invention to provide a management system and method for a wireless communication network which provides an efficient and convenient graphic user interface for displaying the future operation status of network components, thereby facilitating the telecom user to perform network diagnosis and network adjustment for remedy.

Another objective of the present invention is to provide a management system and method for a wireless communication network which provides more accurate prediction by considering the influence from the parent, son, and neighbor components of a network component.

According to one embodiment of the present invention, a management system for a wireless communication network is provided. The management system comprises: a forecast module for generating a forecast value for a first operation index of at least a first network component of the wireless communication network during at least a forecast period; and a display module, connected to the forecast module, for providing a graphic user interface which comprises a forecast table to show the forecast value. The forecast module determines whether to enable a warning function of the graphic user interface according to a comparison of the forecast value and a warning value.

According to another embodiment of the present invention, a management method for a wireless communication network is provided. The management method comprises: generating a forecast value for an operation index of at least a network component of the wireless communication network during at least a forecast period; providing a graphic user interface which comprises a forecast table to show the forecast value; and determining whether to enable a warning function of the graphic user interface according to a comparison of the forecast value and a warning value.

According to another embodiment of the present invention, a graphic user interface for managing a wireless communication network is provided. The graphic user interface comprises: a forecast table for showing a forecast value for an operation index of at least a network component of the wireless communication network during at least a forecast period; a network tree graph for displaying a tree structure of a plurality of network components of the wireless communication network; and a map for showing where the network components are located. Whether a warning function of the graphic user interface is enabled is determined according to a comparison of the forecast value and a warning value.

BRIEF DESCRIPTION OF THE DRAWINGS

FIG. 3B shows an example of the time series of forecast values of an operation index under the original and adjusted plans.

FIG. 5A to 5C respectively show the content of each function tab of the function window in FIG. 2.

DETAILED DESCRIPTION

Though the embodiments described below may take a GSM (i.e. Global System for Mobile communication) network for example, people skilled in the art can easily apply technological features of the present invention to other wireless communication networks. Thus, the scope of the present invention is not limited to the GSM network.

Figure 1:
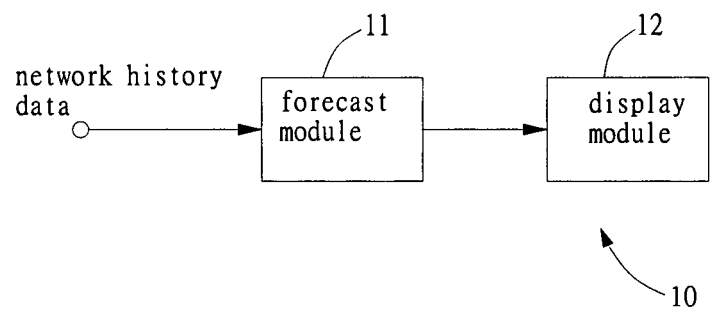
FIG. 1 is a block diagram of a preferred embodiment of a management system for a wireless communication network according to the present invention.

FIG. 1 is a block diagram of a preferred embodiment of a management system for a wireless communication network according to the present invention. The wireless communication network includes a plurality of network components deployed as a multi-level structure. For example, a GSM network may contain, from top to bottom, a network level (the GSM network itself), a MSC (i.e. mobile switching center) level, a BSC (i.e. base station controller) level, a BTS (i.e. base transceiver station) level and a cell level. As shown in FIG. 1, the management system 10 includes a forecast module 11 and a display module 12. According to received network history data, the forecast module 11 generates a forecast value for each available operation index of the network components of the wireless communication network during a plurality of forecast periods. The network history data record network traffic status or network user behavior during past periods, and are provided by various sources, such as an operation and maintenance center (OMC) or operation support system (OSS), a database, or an optical disk. The OMC usually provides real-time or short-term statistic data, while long-term statistic data are stored in the database and the optical disk. In general, an operation index of a network component reflects a specific network traffic status or network user behavior involving the network component, and history values of the operation index can be retrieved or derived from the network history data. The types of the operation index are various, for example, the operation index of a MSC includes Erlang, port, BHCA (i.e. busy hour call attempt), CPU loading, etc. These examples of the operation index are well known to people skilled in the art and will not be described in detail here. Besides, the operation index may be directly used as a network performance index, such as a key performance index (KPI).

Figure 2:
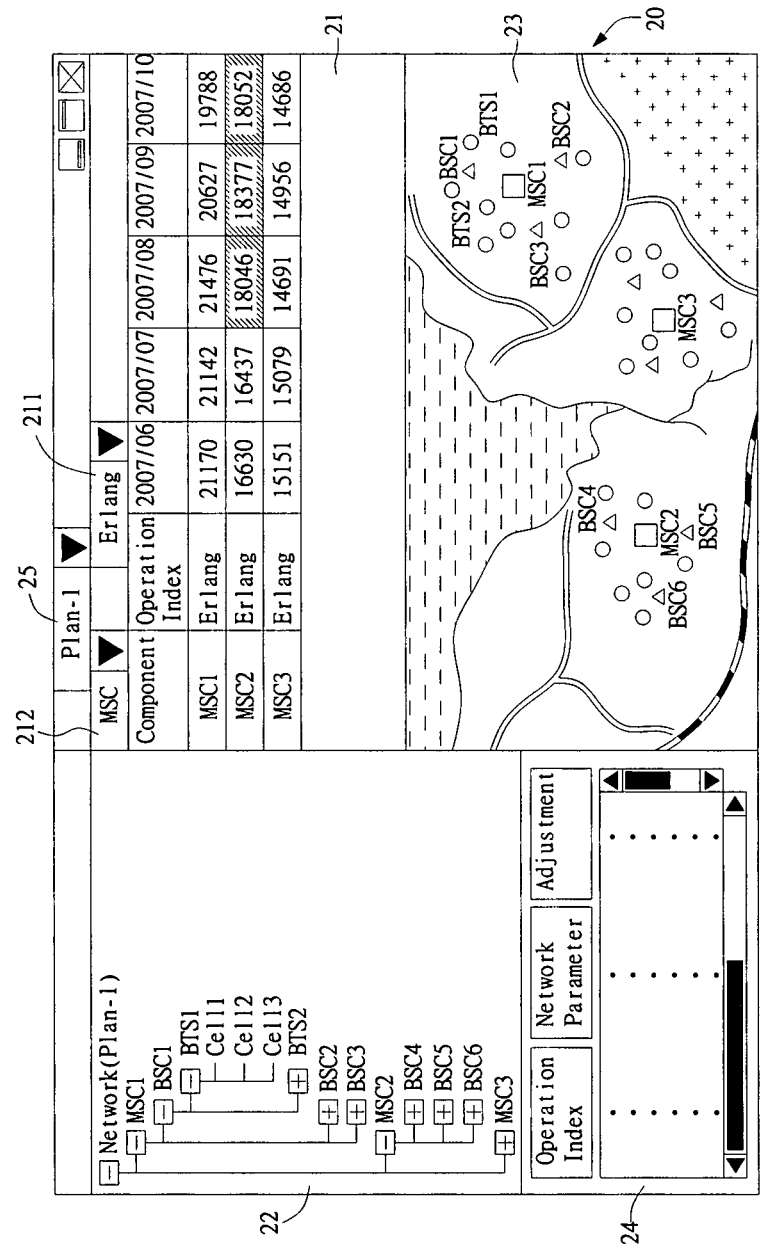
FIG. 2 is a diagram showing an embodiment of a graphic user interface provided by the display module in FIG. 1.

The display module 12 is connected to the forecast module 11, and provides a graphic user interface 20 for a telecom user or network administrator to manage the wireless communication network. FIG. 2 is a diagram showing an embodiment of the graphic user interface 20, where the graphic user interface 20 includes a forecast table 21, a network tree graph 22, a map 23, and a function window 24. The forecast table 21 shows a forecast value for a certain operation index (selected by an index-selecting field 211) of each network component of a certain level (selected by a level-selecting field 212) of the wireless communication network during a plurality of forecast periods. The graphic user interface 20 in FIG. 2 takes a GSM network as example, and the forecast table 21 shows the forecast values for the operation index "Erlang" of the network components (i.e. MSC1~MSC3) of the MSC level during June of 2007 to October of 2007. It is notable that the forecast table 21 can also show the forecast values for more forecast periods and the history values for past periods, thereby facilitating the telecom user to observe the variation trend of the operation index.

Moreover, for each network component shown in the forecast table 21, the forecast module 11 determines whether to enable a warning function of the graphic user interface 20 according to a comparison of the forecast value and a warning value for the operation index of the network component. If the forecast value exceeds the warning value, it means the network component is under an overloaded state and needs an adjustment for remedy. It is notable that the warning value for the same operation index of different network components can be different. The warning function warns the telecom user by using a distinct color (e.g. red) to show the forecast value that exceeds the warning value. In FIG. 2, the forecast values for Erlang of MSC2 during August to October of 2007 exceed the warning value, and are shown in the distinct color (represented by oblique lines in FIG. 2). It is notable that more than one warning value can be used to indicate various warning degrees, and the warning function can use different colors to show the forecast values for differentiation.

Figure 3A:
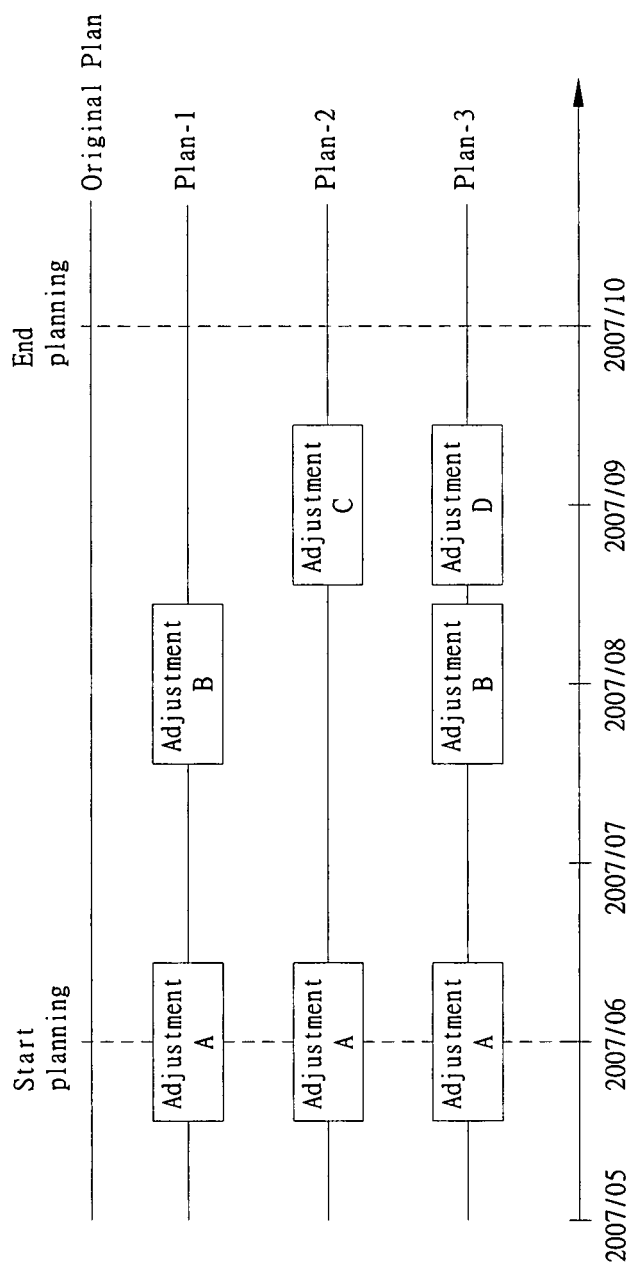
FIG. 3A shows an example of generating adjusted plans of the wireless communication network.

The graphic user interface 20 further includes a plan-selecting field 25 for selecting an original or adjusted network plan of the wireless communication network to show the forecast value of the operation index thereunder. A network plan means how the components of a network are organized or connected. Through the graphic user interface 20, various types of adjustments (will be further described below) can be made on the original network plan to generate an adjusted network plan. The forecast table 21 can then show the forecast values of the operation index under different network plans for comparison. For example, the telecom user can take June to October of 2007 as a planning period to generate three different adjusted plans by performing different (or different sets of) adjustments during different forecast periods, as shown in FIG. 3A. In FIG. 3A, Plan-1 is generated by making Adjustment A in June 2007 and Adjustment B in August 2007, Plan-2 is generated by making Adjustment A in June 2007 and Adjustment C in September 2007, and Plan-3 is generated by making Adjustment A in June 2007, Adjustment B in August 2007 and Adjustment D in September 2007. Then, in FIG. 3B, the time series of the forecast values of the operation index (Erlang as shown) under the original and adjusted plans during June 2007~October 2007 are shown in the forecast table 21 for convenient comparison. It is notable that in FIG. 3B, a "X" symbol (other identifiable symbol can also be used) in front of a forecast period means that there is an adjustment made during this period.

Figure 4:
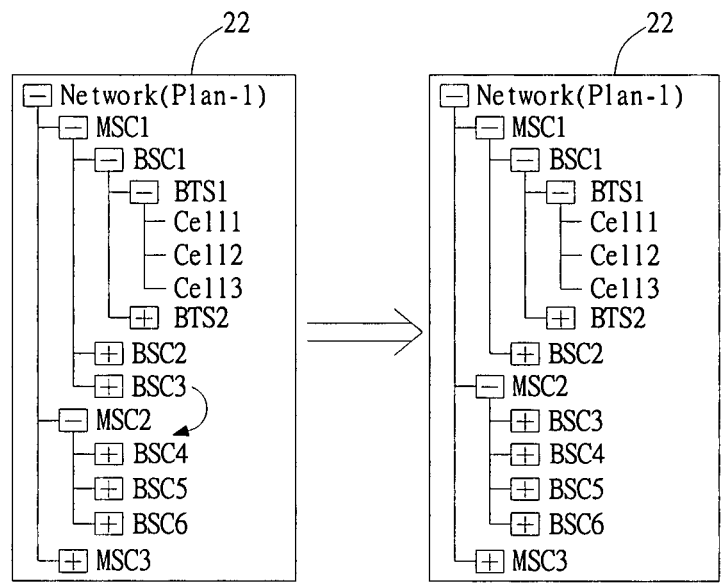
FIG. 4 shows an adjustment of the tree structure of the wireless communication network by means of the network tree graph in FIG. 2.

The network tree graph 22 displays a tree structure of the network components of the wireless communication network. The tree structure is inherent in the multi-level structure of the network, and an upper-level (or parent) component manages at least one lower-level (or son) component. In FIG. 2, the network tree graph 22 shows a five-level (i.e. network level, MSC level, BSC level, BTS level and cell level) tree structure of Plan-1 of the GSM network. The "+" symbol in front of a network component means there are hidden lower-level components under it, and the "−" symbol means the hidden lower-level components are explicitly shown. By means of the network tree graph 22, the tree structure can be easily adjusted. For example, by using a pointing device (e.g. mouse), BSC3 can be easily moved (rehomed) from MSC1 to MSC2, as shown by FIG. 4.

The map 23 shows where the network components of the wireless communication network are located. The network components can be shown in a visualized manner for convenient observation. For example, the components of different levels can be shown in different shapes, such as circles (i.e. BTS in FIG. 2), triangles (i.e. BSC in FIG. 2), rectangles (i.e. MSC in FIG. 2), etc. Also, the son components belonging to the same parent component can be shown in the same color.

By combining the forecast table 21, the network tree graph 22, and the map 23, the telecom user can easily perform a network diagnosis by observing the status of parent and son components and neighboring components of some problematic component. For instance, if the forecast table 21 indicates that the forecast value for a specific operation index of a specific MSC exceeds the warning value, then the telecom user can observe whether the specific MSC contains too many BSCs through the network tree graph 22 or observe the distribution of the BSCs of the specific MSC through the map 23 to find out the problem cause.

Figure 5B:
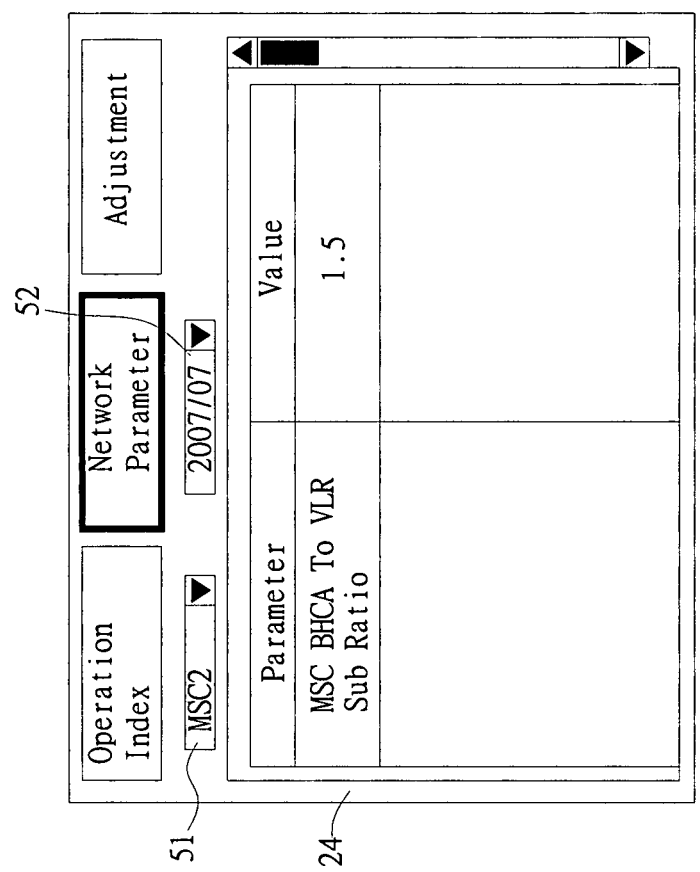

The function window 24 provides several functions to facilitate the telecom user to manage the wireless communication network. As shown in FIG. 2, the function window 24 includes three function tabs: Operation Index, Network Parameter and Adjustment, and the content of these tabs are shown in FIG. 5A~5C. FIG. 5A shows the content of the Operation Index tab, which includes a component-selecting field 51 for selecting a network component and a period-selecting field 52 for selecting a forecast period. The other content of the Operation Index tab are arranged into a plurality of columns for showing related information for each available operation index of the selected component during the selected forecast period. The column "Item" includes the name, percentage and formula for each available operation index. In the column "Capacity", the fields corresponding to the items of name and percentage are respectively a limit value of the operation index and the warning percentage of the limit value, i.e. warning value=limit value*warning percentage %. For example, in FIG. 5A, the limit value of Erlang of MSC1 is 24000 and the warning percentage of Erlang of MSC 1 is 80 during July 2007.

In the "Original" (i.e. original-plan) and "Plan-1" columns (Plan-2 and Plan-3 columns can be shown by scrolling a scrolling bar 53), the fields corresponding to the items of name, percentage and formula are respectively the forecast value, the percentage of the forecast value to the limit value and the formula used for calculating the forecast value under the respective plan. The formula is determined according to at least an operation index and at least a network parameter, such as mathematical operations on the operation index and network parameter. For example, in FIG. 5A, the forecast value of Erlang of MSC1 is 16437 and the percentage of the forecast value to the limit value under the original plan is 68.49 during July 2007; the formula for calculating the forecast value of Erlang of MSC 1 is "[MSC BHCA]*[MSC BHCA To VLR Sub Ratio]" (the full expression of the formula can be shown by using a pointing device to click the corresponding field), where "MSC BHCA" is another operation index and MSC BHCA To VLR Sub Ratio is a network parameter.

Moreover, the warning value for an operation index can be adjusted by directly changing the field of the "Capacity" column for recording the limit value or the warning percentage of the operation index. The formula for calculating the forecast value of an operation index can also be adjusted by directly changing the fields of the Original, Plan-1, Plan-2 or Plan-3 column for recording the formula.

FIG. 5B shows the content of the Network Parameter tab, which also includes the component-selecting field 51 and the period-selecting field 52. The other content of the Network Parameter tab are arranged into "Parameter" and "Value" columns for recording the setting value for each network parameter included in the formulas for calculating the forecast values for the operation indexes of the selected component during the selected forecast period. For example, in FIG. 5B, the setting value of MSC BHCA To VLR Sub Ratio, which is included in the formula for calculating the forecast value of Erlang of MSC1 during July 2007, is 1.5. There may be other network parameters and are not shown in FIG. 5B for simplicity. The setting value of a network parameter can be adjusted by directly changing the field of the "Value" column for recording the setting value of the network parameter.

FIG. 5C shows the content of the Adjustment tab, which includes the period-selecting field 52 and a plan-selecting field 54 for selecting the original plan or an adjusted plan. The other content of the Adjustment tab are arranged into the columns of "Time", "Level", "Component", "Type", "From (former state)" and "To (target state)" for recording related information of each adjustment performed not later than the selected forecast period under the selected plan. The types of the adjustment include:

(1) Rehome adjustment: this means moving a son component from its former parent component to a new parent component. The rehome adjustment can be achieved by means of the network tree graph 22, as described above. For example, in FIG. 5C, a rehome adjustment is performed during July 2007 at BSC level under Plan-1, where BSC3 is moved from MSC1 to MSC3.

(2) Warning value adjustment: this can be achieved by changing the limit value or the warning percentage of an operation index via the Operation Index tab of the function window 24, as described above. For example, in FIG. 5C, a warning value adjustment is performed during July 2007 at MSC level under Plan-1, where the limit value of Erlang of MSC3 is changed from 24000 to 54000.

(3) Formula adjustment: this can be achieved by directly changing the field in the Operation Index tab of the function window 24 for recording a formula, as described above.

(4) Parameter adjustment: this can be achieved by directly changing the field in the Network Parameter tab of the function window 24 for recording the setting value of a network parameter, as described above.

After an adjustment is performed, its related information will be recorded in the Adjustment tab of the function window 24. If the performed adjustment influences a forecast value or the warning state of a forecast value thereafter, the prediction module will update the influenced forecast value or warning state according to the performed adjustment and show the updated result in the graphic user interface 20.

In one embodiment, the forecast module 11 is a computer running a forecast software, and the display module 12 is a CRT or LDC monitor. In another embodiment, the graphic user interface 20 is a window interface of an operating system.

Figure 6B:
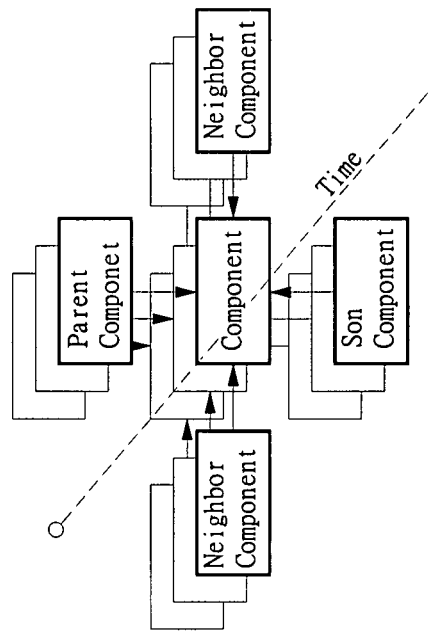
FIGS. 6A and 6B shows how the forecast module in FIG. 1 considers the influence from the parent, son, and neighbor components of a certain component.
Figure 6A:
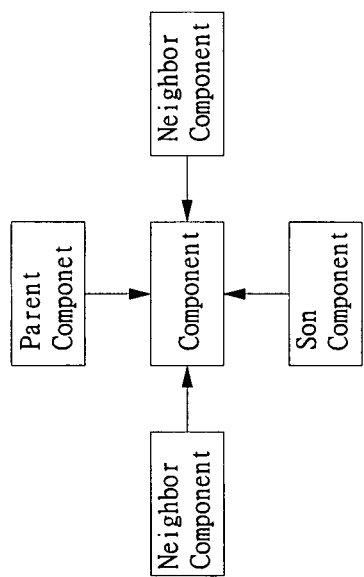

When generating a forecast value for an operation index of a certain network component, the forecast module 11 not only uses the time series of history values, but also considers the influence from the parent, son, and neighbor components of the certain component, as shown in FIG. 6A. Further, the generated forecast values can be used as part of the time series data to generate the next forecast value, as shown in FIG. 6B, such that the forecast values with more accuracy can be generated.

The influence from the parent, son and neighbor components can be respectively modeled as a parent effect ratio, a son effect ratio and a neighbor effect ratio. A total effect ratio can be generated according to these three effect ratios, e.g. total effect ratio=parent effect ratio+son effect ratio+neighbor effect ratio. Therefore, when generating a forecast value, the forecast module 11 first generates an initial prediction value by the time series prediction technique (which is well known to people skilled in the art and will not be elaborated here), and then multiplies the initial prediction value with the total effect ratio to generate the forecast value. That is, the total effect ratio is used to correct the value generated by the time series prediction, thereby providing the forecast value with more accuracy.

The parent effect ratio can be determined according to the variation of the operation index of the parent component. For instance, for a certain MSC (e.g. MSC1), the variation of the operation index of its parent component (i.e. the whole network) can be derived from an estimated growth rate of subscribers (or traffic) of the whole network. The estimated growth rate can be generated according to marketing effect, the growth/decline of new/old technology (e.g. 3G/2G network), etc. Next, the variation of the operation index of the whole network (e.g. 10%) can be distributed to MSC1 according to a distribution percentage, which can be determined according to, for example, the average ratio of the operation index of MSC1 to that of the whole network during past periods. Then, the parent effect ratio of MSC1 can be determined from the variation of the operation index of the whole network and the distribution percentage. The parent effect ratio of a BSC or a BTS can also be determined in the manner similar to above.

The son effect ratio can be determined according to the variation of the operation index of the son component. For instance, if MSC1 includes n BSCs (i.e. BSC 1~BSC n), then the variation of the operation index of MSC1=the sum of [(the variation of the operation index of BSC k)*$a_k$], where k=1~n and $a_k$ is the weight coefficient determined by statistical methods. Then, the son effect ratio of MSC1 can be determined from the variation of the operation index of MSC1, which results from the variation of the operation index of its son components BSC 1~BSC n. It is notable that a newly added or rehomed BSC may be included in BSC 1~BSC n. The son effect ratio of a BSC or a BTS can also be determined in the manner similar to above.

The neighbor effect ratio can be determined according to the variation of the operation index of the neighbor component. For instance, if some neighbor MSC of MSC1 is overloaded, then a portion of traffic of the neighbor MSC will be re-assigned to MSC 1 (reflected in the variation of the operation index of the neighbor MSC); a newly added neighbor MSC will share some loading of MSC1 (reflected in the variation of the operation index of the new MSC). Then, the neighbor effect ratio of MSC1 can be determined from the factors as described above. The neighbor effect ratio of a BSC or a BTS can also be determined in the similar manner.

Figure 7:
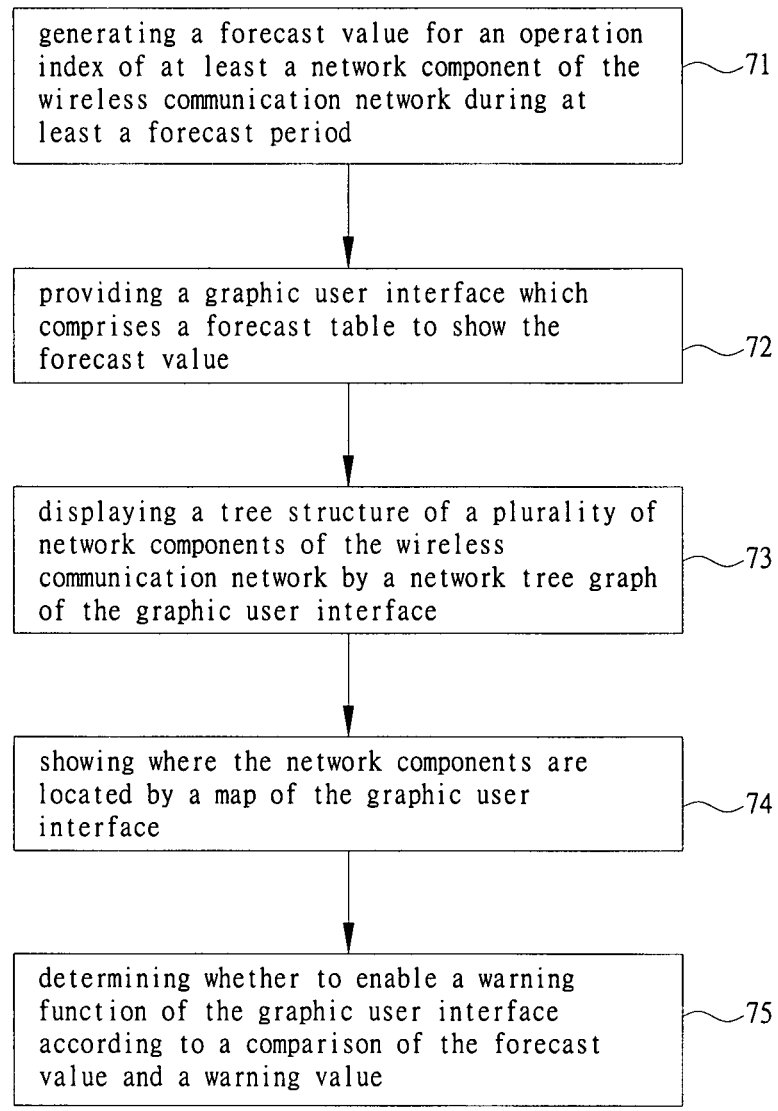
FIG. 7 is a flow chart of a preferred embodiment of the management method for a wireless communication network according to the present invention.

FIG. 7 is a flow chart of a preferred embodiment of the management method for a wireless communication network according to the present invention. The flow in FIG. 7 comprises steps of:

71 generating a forecast value for an operation index of at least a network component of the wireless communication network during at least a forecast period;

72 providing a graphic user interface which comprises a forecast table to show the forecast value;

73 displaying a tree structure of a plurality of network components of the wireless communication network by a network tree graph of the graphic user interface;

74 showing where the network components are located by a map of the graphic user interface; and 75 determining whether to enable a warning function of the graphic user interface according to a comparison of the forecast value and a warning value.

While the present invention has been shown and described with reference to the preferred embodiments thereof and in terms of the illustrative drawings, it should not be considered as limited thereby. Various possible modifications and alterations could be conceived of by one skilled in the art to the form and the content of any particular embodiment, without departing from the scope and the spirit of the present invention.

What is claimed is:

1. A management system for a wireless communication network comprising:
   a forecast module for generating a forecast value for a first operation index of at least a first network component of the wireless communication network during at least a forecast period; and
   a display module, connected to the forecast module, for providing a graphic user interface which comprises a forecast table to show the forecast value;
   wherein the forecast module determines whether to enable a warning function of the graphic user interface according to a comparison of the forecast value and a warning value;
   wherein the forecast module generates the forecast value according to an initial prediction value and a total effect ratio, wherein the forecast module generates the initial prediction value by a time series prediction technique, and generates the total effect ratio according to a parent effect ratio, a son effect ratio and a neighbor effect ratio;
   wherein the parent effect ratio is determined according to a variation of a first operation index of each parent network component of the first network component, the son effect ratio is determined according to a variation of a first operation index of each son network component of the first network component, and the neighbor effect ratio is determined according to a variation of a first operation index of each neighbor network component of the first network component.

2. The management system of claim 1, wherein the forecast table comprises a level-selecting field for selecting one of a plurality of levels of the wireless communication network, wherein the forecast table shows forecast values for the first operation index of a plurality of network components of the selected level during at least the forecast period.

3. The management system of claim 2, wherein the graphic user interface further comprises a network tree graph to display a tree structure of the network components of the levels.

4. The management system of claim 3, wherein an adjustment of the tree structure is performed by means of the network tree graph.

5. The management system of claim 1, wherein the graphic user interface further comprises a map for showing where a plurality of network components of the wireless communication network are located.

6. The management system of claim 1, wherein the graphic user interface further comprises a function window for showing the warning value.

7. The management system of claim 6, wherein the warning value is shown by a limit value of the first operation index and a percentage of the limit value.

8. The management system of claim 6, wherein the warning value is adjusted by means of the function window.

9. The management system of claim 6, wherein the function window further shows a formula for calculating the warning value.

10. The management system of claim 9, wherein the formula is determined according to at least a second operation index and at least a network parameter, wherein the network parameter is adjusted by means of the function window.

11. The management system of claim 9, wherein the formula is adjusted by means of the function window.

12. The management system of claim 6, wherein an adjustment for the wireless communication system is performed by means of the graphic user interface, wherein the adjustment is one of the following types: rehome adjustment, warning value adjustment, formula adjustment, and parameter adjustment.

13. The management system of claim 12, wherein the forecast value and the warning value are selectively updated according to the adjustment.

14. The management system of claim 12, wherein the function window records a related information of the adjustment, wherein the related information comprises at least one of the following: performing time, performing level, performed network component, adjustment type, former state and target state.

15. The management system of claim 12, wherein the forecast table shows a first forecast value and a second forecast value for the first operation index of the first network component during the forecast period, wherein the first forecast value and the second forecast value are respectively corresponding to a first set of adjustments and a second set of adjustments, both of which are performed not later than the forecast period.

16. A management method for a wireless communication network comprising:
   generating a forecast value for an operation index of at least a network component of the wireless communication network during at least a forecast period;
   providing a graphic user interface which comprises a forecast table to show the forecast value; and
   determining whether to enable a warning function of the graphic user interface according to a comparison of the forecast value and a warning value;

wherein the forecast value is generated according to an initial prediction value and a total effect ratio, wherein the initial prediction value is generated by a time series prediction technique, and the total effect ratio is generated according to a parent effect ratio, a son effect ratio and a neighbor effect ratio;

wherein the parent effect ratio is determined according to a variation of an operation index of each parent network component of the at least a network component, the son effect ratio is determined according to a variation of an operation index of each son network component of the at least a network component, and the neighbor effect ratio is determined according to a variation of an operation index of each neighbor network component of the at least a network component.

17. The management method of claim 16, further comprising:

displaying a tree structure of a plurality of network components of the wireless communication network by a network tree graph of the graphic user interface.

18. The management method of claim 16, further comprising:

showing where a plurality of network components of the wireless communication network are located by a map of the graphic user interface.

* * * * *